United States Patent [19]
Abbott

[11] 4,046,657
[45] Sept. 6, 1977

[54] APPARATUS AND METHOD OF ASSISTING PILE DRIVING BY ELECTRO-OSMOSIS

[76] Inventor: Phillip Andrew Abbott, 1430 Fountainview Drive, No. 310, Houston, Tex. 77057

[21] Appl. No.: 683,564

[22] Filed: May 5, 1976

[51] Int. Cl.² .................... B01D 13/02; E02D 7/26
[52] U.S. Cl. ..................... 204/180 R; 61/36 R; 61/53.5; 166/248; 175/19; 204/299 R
[58] Field of Search ............. 204/180 R, 299; 61/53.5, 36; 175/19; 166/248

[56] References Cited

U.S. PATENT DOCUMENTS

| 2,217,857 | 10/1940 | Byck | 204/180 R X |
| 2,283,206 | 5/1942 | Hayward | 204/180 R |
| 2,372,575 | 3/1945 | Hayward | 204/180 R X |
| 2,625,374 | 1/1953 | Neuman | 204/180 R X |
| 2,806,818 | 9/1957 | Howard | 204/180 R X |
| 3,289,420 | 12/1966 | Guy | 61/53.5 |
| 3,312,295 | 4/1967 | Bodine, Jr. | 175/19 |
| 3,353,362 | 11/1967 | Lubinski | 61/53.5 |
| 3,406,524 | 10/1968 | Blenkarn et al. | 175/19 |
| 3,417,823 | 12/1968 | Faris | 204/180 R X |
| 3,766,741 | 10/1973 | Hartzell | 61/53.5 |

OTHER PUBLICATIONS

Nikolaev, "Pile Driving by Electro-Osmosis", Consultants Bureau, 1962.
Wang, "Stresses in a Saturated Soil Mass During Electro-Osmosis", Consultants Bureau.
Begemann, "The Influence of D.C. Potential on Adhesion Between Clay and Metal Objects,".

Primary Examiner—Arthur C. Prescott
Attorney, Agent, or Firm—Fulbright & Jaworski

[57] ABSTRACT

An apparatus and method of assisting the driving of a hollow pile into soil by electro-osmosis in which electrical direct current is directed downwardly through the inside of the pile, out the bottom of the pile, and up the outside of the pile whereby water on the inside of the pile moves through the soil thereby making the pile easier to drive into the soil. The method includes insulating an electrically conductive pile preferably on the inside with an electrical non-conductor and placing water inside of the hollow pile. An electrical circuit having a d-c power source, and an anode and cathode is provided in which the anode is placed in the water inside of the hollow pile and the cathode is placed outside of the hollow pile and in electrical communication with the outside of the electrical conductive pile whereby an electrical circuit is formed between the anode and cathode through the water in the inside of the pile and through the bottom of the pile. When electrical power is supplied to the circuit, water will move down the inside of the pile and up the outside of the pile and into the soil adjacent the pile making the pile easier to drive through the soil. In addition, after the pile has been driven, the current flow may be reversed through the electrical circuit for reducing the water content of the soil adjacent the pile thereby increasing the load bearing strength of the soil.

10 Claims, 2 Drawing Figures

APPARATUS AND METHOD OF ASSISTING PILE DRIVING BY ELECTRO-OSMOSIS

BACKGROUND OF THE INVENTION

The principle of electro-osmosis is used in the field of soil mechanics to describe the effect of water moving through a non-granular soil from an anode to a cathode upon the application of a direct current power source. This principle has been used in the past to dewater soils to increase their strength. Electro-osmosis has also been utilized to assist pile driving by making the pile the cathode and having exteriorly placed anodes, but such prior methods are not useful when the soil lies below water level since the power will be transmitted through the water with little effect in the soil.

The present invention is directed to an improved method of assisting pile driving by electro-osmosis by directing the current down through the inside of the pile and up the outside of the pile through the soil adjacent to where the pile is being driven to move water through the soil whereby the pile can be more easily driven. The driving is made easier not only because of the increase in water content adjacent to the outer surface of the pile but also because of two additional phenomena. There is a repulsion between the negatively charged exterior pile surface and the natural negative charge of soil particles. Also, hydrogen gas bubbles form on the exterior surface of the pile due to electrolysis and these bubbles also tend to reduce the adhesion of a cohesive soil to the pile.

SUMMARY

The present invention is directed to an apparatus and method of assisting the driving of a hollow pile into soil by directing an electrical direct current down the inside, out the bottom, and up the outside of the pile to move water into the soil about the pile whereby the pile can be more easily driven.

A further object of the present invention is insulating an electrically conductive hollow pile, preferably on the inside with an electrical non-conductor, placing water inside of the hollow pile, and passing an electrical direct current through the water in the pile and up the outside of the pile when the pile is in contact with the soil whereby the water in the pile will move down the inside of the pile and up the outside of the pile through the soil making the pile easier to drive through the soil.

Yet a further object of the present invention is the provision of assisting the driving of a hollow electrically conductive pipe into soil by insulating the pile on the inside, placing water inside of the hollow pile, providing a d-c electrical circuit having an anode, a power source and a cathode. The anode is positioned in the water inside of the hollow pile and the cathode is positioned outside of the hollow pile and in electrical communication with the outside of the pile. When the pile is in contact with the soil, electrical power is applied to the circuit whereby water will move from the inside of the pile and up the outside of the pile through the soil adjacent the pile making the pile easier to drive through the soil.

A still further object of the present invention is the provision of assisting the driving of a hollow electrically conductive pile into soil below water in which the cathode of the electrical circuit is placed outside of the hollow pile and in the water above the soil.

Still a further object of the present invention is the provision of reversing the current flow through the electrical circuit, after the pile has been driven, for reducing the water content of the soil adjacent the pile and increasing the load bearing strength of the soil.

Other and further objects, features and advantages will be apparent from the following description of a presently preferred embodiment of the invention, given for the purpose of disclosure and taken in conjunction with the accompanying drawings.

DESCRIPTION OF THE PREFERRED EMBODIMENT

Figures 1, 2:
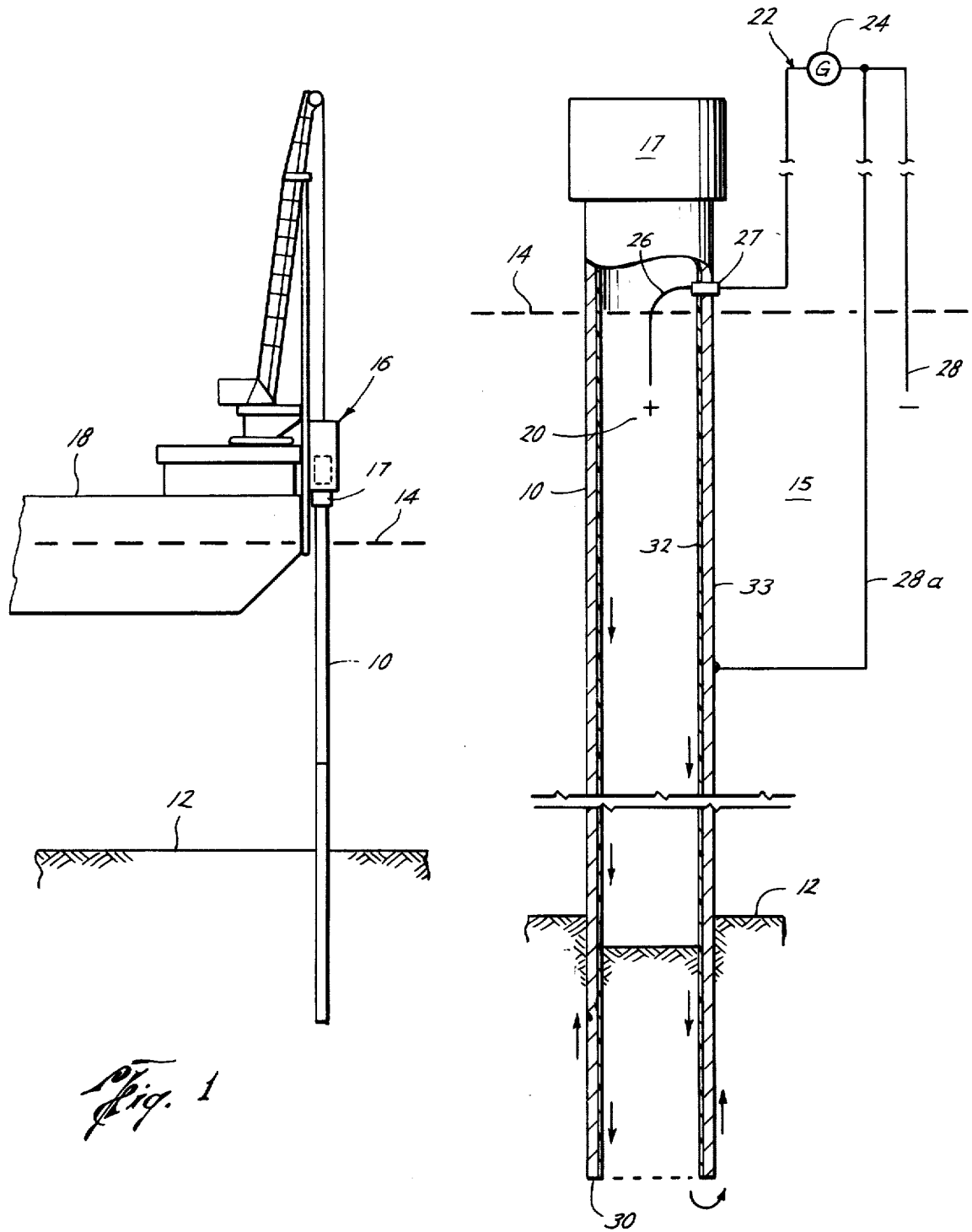
FIG. 1 is an elevational and schematic view of a pile driver driving a pile into the soil below a body of water.
FIG. 2 is an enlarged elevational view, partly in cross section, of a pile being driven utilizing the preferred embodiment of the present invention.

For purposes of illustration, the present invention will be described in conjunction with driving a pile 10 into the soil 12 below the surface 14 of water such as the ocean. The pile 10 is being driven by any suitable type of pile driver 16 mounted on a floating barge 18.

While the present invention is applicable to assisting the driving of various types of hollow piles such as concrete, or plastic piles, the invention will be described for purposes of illustration only, of assisting in the driving of a hollow electrically conductive pile, typically a hollow steel pile. The pile 10 is driven into the soil 12 by the pile driver 16 impacting an anvil 17. However, when the pile 10 is driven into the soil 12, which has any significant clay content, soil is encountered having a minimum of moisture content and it becomes increasingly difficult to drive the pile 10 because of the adhesion and the shear strength of the soil 12 on the inside and particularly on the outside of the pile 10. The present invention utilizes the principle of electro-osmosis by providing an electrical current path which will move water into the soil 12 in which the pile is driven which acts to decrease the strength of the soil whereby the pile 10 may be more easily driven. Referring now to FIG. 2, the pile 10 is shown in position in contact with and being driven into the soil 12. Of course, when the pile 10 is lowered into the water and down to the soil 12, water 20 will fill up the interior of the pile 12 to the same level as the water surface 14. An electrical circuit generally indicated by the reference numeral 22 is provided having a conventional and reversible d-c power source 24, an anode 26 and one or more cathodes 28 and 28a are provided to provide an electrical path down through the inside of pile 10 and up the outside for conducting the water 20 down the inside of the piling 10 and up the outside of the piling 10 for moving the water into the soil at the location in which the pile 10 is driven. The anode 26 passes through a fitting 27 positioned inside of the hollow pipe 10 and in the water 20 below the water level 14. Cathode 28, if used, is placed outside of the hollow pipe 10 in the water 15 or cathode 28a may be used which is connected to the exterior 33 of the electrically conductive pile 10. Since the ocean water 15 is salt water, the water 15 is a suitable electrolyte and the cathode 28, by merely being placed in the water 15, forms an electrical circuit with the exterior of the pile 10 through the water 15.

However in order to insure that the electrical circuit from the anode 26 to one of the cathodes 28 or 28a passes through the bottom 30 of the piling 10, the inside of the pile 10 is insulated with a suitable non-conductor 32, such as wax or plastic, to prevent an electrical flow directly through the wall of the pile 10. In the event that the hollow pile 10 is an electrical non-conductor, the insulating coating 32 may be omitted.

In operation, with the pile 10 in contact with the soil 12, electrical power is supplied by the electrical power source 24, between the anode 26 and one or more of the cathodes 28 or 28a. In this manner, a potential difference is set up between the water 20 inside of the pile 10 and the outside 33 of the pile 10. This causes the water 20 on the inside of the pile 10 to migrate, as indicated by the arrows, downwardly in the interior of the pile 10, out of the bottom 30 and up the outside of the pile 10. When the pile 10 is in the soil, the effect will be to loosen the adhesion of the clay to the outside surface of the pile 10 and to decrease the shear strength of the soil adjacent both the inside and the outside walls of the pile 10 due to the increase in water content resulting from the migration of water down the inside of the pile 10 and up the outside of the pile 10. Also, there will be a negative repulsion between the exterior of the pile 10 and the soil 12 and the formation of hydrogen gas on the exterior of the pile 10 which also tends to reduce adhesion of the soil 12 to the pile 10. This will make the pile 10 easier to drive through the soil 12 by the pile driver 16.

While the present method has been described in connection with driving a hollow pile on land in which event water 20 should be placed inside of the hollow pile, and of course only the cathode 28a would be used which is the one connected directly to the exterior 33 of the pile 10. While it is not the preferred embodiment, the water need not be added in those cases where the soil is water soaked, in which case the anode 26 would be inserted in the soil on the inside of the pile 10, and the water in the soil on the inside would be moved to the outside of the pile to increase the water on the outside which is the location at which adhesive soil forces are greatest.

The principle of electro-osmosis is reversible in that once the polarity of the electrical circuit is reversed, the soil 12 adjacent the pile 10 can be driven out and its strength and adhesion properties can be regained. Therefore, the present method includes, after the pile 10 has been driven to its desired depth, of reversing the current flow in the electrical circuit 22 for reducing the water content of the soil 12 adjacent the pile 10 and increasing the load bearing strength of the soil 12.

The present invention, therefore, is well adapted to carry out the objects and attain the ends and advantages mentioned as well as others inherent therein. While a presently preferred embodiment of the invention is given for the purpose of disclosure, numerous changes in the details of construction, arrangement of parts, and steps of the process will readily suggest themselves to those skilled in the art and which are encompassed within the spirit of the invention and the scope of the appended claims.

What is claimed is:

1. A method of assisting the driving of a hollow pile into soil containing water comprising,
   when the pile is in contact with the soil, directing a direct current downwardly through the soil on the inside of the pile, out the bottom of the pile, and up the outside of the pile whereby water on the inside of the pile will move out and up the outside of the pile making the pile easier to drive through the soil.

2. A method of assisting the driving of a hollow pile into soil comprising,
   placing water inside of the hollow pile,
   when the pile is in contact with the soil, directing a direct current downwardly through said water and said pile, out the bottom of the pile, and up the outside of the pile whereby water will be caused to move down the inside of the pile and up the outside of the pile through the soil making the pile easier to drive through the soil.

3. The method of claim 2 including,
   after the pile has been driven, reversing the current flow through the electrical circuit for reducing the water content of the soil adjacent the pile and increasing the load bearing strength of the soil.

4. A method of assisting the driving of a hollow pile into soil comprising,
   insulating the pile on the inside with an electrical non-conductor,
   placing water inside of the hollow pile,
   placing an anode of an electrical circuit having an anode, a d-c power source, and a cathode, in the water inside of the hollow pile,
   placing the cathode outside of the hollow pile and in electrical communication with the water in the pile through the bottom of the pile, and
   when the pile is in contact with the soil applying electrical power to the circuit whereby water will be caused to move down the inside of the pile and up the outside of the pile through the soil making the pile easier to drive through the soil.

5. The method of claim 4 including,
   after the pile has been driven, reversing the current flow through the electrical circuit for reducing the water content of the soil adjacent the pile and increasing the load bearing strength of the soil.

6. A method of assisting the driving of a hollow pile into soil below water comprising,
   insulating the pile on the inside with an electrical non-conductor,
   placing water inside of the hollow pile,
   placing an anode of an electrical circuit having an anode, a d-c power source, and a cathode, in the water inside of the hollow pile,
   placing the cathode outside of the hollow pile and in electrical communication with the water above the soil, and
   when the pile is in contact with the soil applying electrical power to the circuit whereby water will be caused to move down the inside of the pile and up the outside of the pile through the soil making the pile easier to drive through the soil.

7. The method of claim 6 including,
   after the pile has been driven, reversing the current flow through the electrical circuit for reducing the water content of the soil adjacent the pile and increasing the load bearing strength of the soil.

8. A method of assisting the driving of a hollow electrically conductive pile into soil comprising,
   insulating the pile on the inside with an electrical non-conductor,
   placing water inside of the hollow pile,
   placing an anode of an electrical circuit having an anode, a d-c power source, and a cathode, in the water inside of the hollow pile, placing the cathode outside of the hollow pile and in electrical communication with the outside of the electrically conductive pile whereby an electrical circuit is formed between the anode and cathode through the water in the inside of the pile and through the bottom of the pile, and when the pile is in contact with the soil applying electrical power to the circuit whereby water will be caused to move down the inside of the pile and up the outside of the pile through the soil adjacent the pile making the pile easier to drive through the soil.

9. The method of claim 8 including, after the pile has been driven, reversing the current flow through the electrical circuit for reducing the water content of the soil adjacent the pile and increasing the load bearing strength of the soil.

10. A method of assisting the driving into soil of a hollow electrically conductive pile which has an electrically insulating coating on the interior comprising, placing the pile in contact with the soil, providing water in the inside of the pile, and when the pile is in contact with the soil generating an electric direct current through the water in the pile, through the bottom of the pile, and up the outside of the pile whereby the water in the pile will be caused to move down the inside of the pile and up the outside of the pile through the soil making the pile easier to drive through the soil.

* * * * *